(No Model.)
W. R. COLE.
STORE SERVICE APPARATUS.
No. 466,887. Patented Jan. 12, 1892.
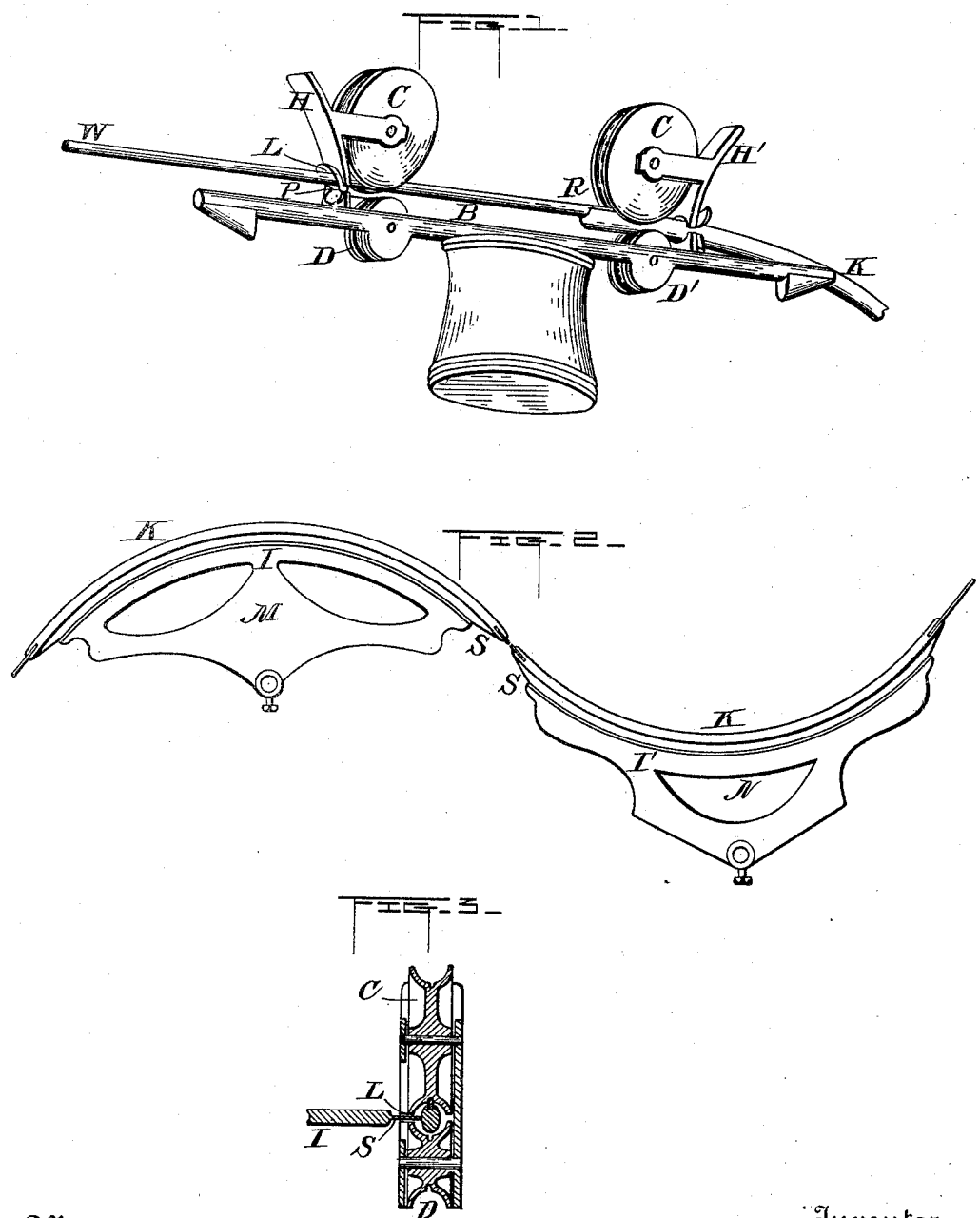
Witnesses
Severance
Chas. Landis
Inventor
William R. Cole,
by J. L. Rusk,
Attorney

UNITED STATES PATENT OFFICE.

WILLIAM R. COLE, OF DETROIT, MICHIGAN, ASSIGNOR, BY MESNE ASSIGNMENTS, TO THE LAMSON CONSOLIDATED STORE SERVICE COMPANY, OF BOSTON, MASSACHUSETTS.

STORE-SERVICE APPARATUS.

SPECIFICATION forming part of Letters Patent No. 466,887, dated January 12, 1892.

Application filed November 23, 1886. Serial No. 219,732. (No model.)

*To all whom it may concern:*

Be it known that I, WILLIAM R. COLE, a citizen of the United States, residing at Detroit, in the county of Wayne and State of Michigan, have invented a new and useful Improvement in Store-Service Apparatus, of which the following is a specification.

My improvement relates, particularly, to that class of store-service apparatus designed for carrying cash and parcels from one portion of a store-building to another by means of a receptacle suspended from a car adapted to travel upon a single strained wireway so arranged that the way is not straight throughout, but has one or more curves in its course.

The novel features of my device consist in the manner of supporting the wire track at its point of attachment to the curve or around the curve when the wire is made continuous, and in the car which is adapted to travel upon the wire and pass the curve and its supports and yet is so constructed that it cannot come off the track or be taken off the track without disassembling the parts.

Figure 1 shows a perspective view of my car with a section of the track, the car being shown partly upon the curved track, the supports to which are not shown in this figure, and partly upon the straight track. Fig. 2 shows a projection of the curves used by me, showing both an interior and an exterior curve. Fig. 3 shows a section through the wheels of my car and through a portion of the curve as the same would appear at the line x x in Fig. 1.

The main body of the car used by me (shown at B in Fig. 1) depends from hangers H H', which support wheels C C'. These wheels are deeply grooved by a peculiarly-shaped groove, (shown in detail in Fig. 3,) so that the recess formed in the periphery of the wheel forms, apparently, two grooves, one placed within the other. The inner and smaller one has its radius of curvature (across the groove) about the same as that of the wire W, and the outer one has its radius of curvature (across the groove) fitted to that part of the track K which forms the curve.

The hanger H of the car is attached to or made solid with the body B of the car and extends upward and over the body of the car, so that the side opposite to the attached side presents an appearance symmetrical therewith, with the exception of the small slit L.

Through the hanger H, lengthwise of the car, I make a perforation P with a bell-mouth on the side opposite the wheel C, having its upper portion high enough to allow the wire W to pass freely through it into the uppermost of the concentric grooves of the wheel C and its lowermost portion low enough to permit the free passage of the rib K of a curve M or N. The slit L opens into the aperture P at a point just opposite the lower edge of the wheel C and is wide enough to permit the passage of the small wire W, opening out, however, on the side opposite the wheel C, so as to guide the slit with certainty upon the supporting-piece S. (Shown in Fig. 2.)

On the body of the car B, at points directly below the center of the wheel C C', I place friction-rollers D D', grooved in the same manner as the wheel C and placed so closely to the wheel C that the flanges coming opposite the wheel C will not permit the wire W to pass between them and will require the removal of either the one or the other to permit the car to be placed on or removed from the track. The deep grooving of the wheel C and roller D permits not only the free passage of the car over the wire W, but over the large and thicker curved part K. The friction-rollers D D' are not essential to the successful working of my car, as the same result is accomplished by erecting standards or ears on the sides of the body of the car which come next to the support of the curve, bringing the upper edges of the standards or ears into such close approximation to the lower edges of the flanges of the wheels C C' as to prevent the passage between them of the wire track, but far enough removed to permit the passage between them of the supporting-plate S. The rib K is itself held firmly to a proper bracket (attached to any firm support) in a curved position by the support S of a thin strip of sheet metal, Fig. 2. This sheet-metal strip is fastened to the bracket I I' on the side opposite to the track and is attached to the rib K by soldering or in any other appropriate way, and is thin enough to pass easily through the slit L and permit the car to pass over the curve which it supports, so that the slits may be made narrower than the thickness of the track-wire, thus preventing the car from escaping from the track. The wire W may be carried around the outside of the curve M in Fig. 2 and on the inside of the curve N in Fig. 2 in a channel cut into the rib K, or it may, as shown in the drawings, be carried to the end of the rib K at its upper surface and there fastened by bending the end of the wire downward at right angles, passing the downturned end through a hole in the rib and turning the end back, thus forming a rectangular hook, as shown by the dotted lines in Fig. 1. I prefer the latter method of attachment, because when that form of attachment is used the car, in passing upon the rib K from the wire W, passes at once without side friction and without rising or falling directly upon the rib and passes off from the same onto the straight wire with equal facility. The ends of the wires W W pass to and are firmly supported near the place where the operating-stations are located.

Heretofore many efforts have been made to provide some means for retaining cash-cars upon wire tracks without interfering with their free movements upon curves, but only with partial success. The problem has been to employ a small track-wire and properly support it at the curve without admitting of its escape, so as to prevent the car from being detached when on the main track, for in all constructions heretofore adopted any passage in the side frame of the car admitting of the support for the curve part of the track would permit the passage of the track-wire. By providing the car-frame with a roller or other part acting as a guard to prevent the track-wire from passing from contact with the wheel and a slit less in width than the thickness of the track-wire in connection with a curved section or rail supported by a thin blade capable of passing between the guard and the wheel and connected to a suitable support I have absolutely locked the car to the track-wire without interfering with the rigid support of the curve-section.

Without limiting myself to the precise construction and arrangement of parts shown, I claim—

In a store-service apparatus, the combination, with a wire track, of a curved track-section consisting of a curved rail connected to the said wire tracks, a blade of less thickness than the wire track supporting the said curved rail, and a carrier moving on the said wire track and curved rail and consisting of a suitable frame having upper and lower oppositely-placed double-grooved wheels at such a distance apart as to prevent the removal of the wire track or of the curved rail, the said grooves being of the contour corresponding to the wire track and curved rail and the said frame having a slit of less width than the thickness of the wire track, but greater than the thickness of the supporting-blades, as described.

WILLIAM R. COLE.

Witnesses:
CHARLES F. BURTON,
ANNA E. WHITE.